(12) United States Patent
Pollmann (10) Patent No.: US 10,378,083 B2
(45) Date of Patent: Aug. 13, 2019

(54) ALUMINIUM DROSS PROCESSING (71) Applicant: TAHA INTERNATIONAL SA, Luxembourg (LU)

(72) Inventor: Frank Pollmann, Qurayya (BH)

(73) Assignee: TAHA INTERNATIONAL SA, Luxembourg (LU)

( * ) Notice: Subject to any disclaimer, the term of this patent is extended or adjusted under 35 U.S.C. 154(b) by 393 days.

(21) Appl. No.: 14/901,196

(22) PCT Filed: Jun. 25, 2014

(86) PCT No.: PCT/EP2014/063452
§ 371 (c)(1),
(2) Date: Dec. 28, 2015

(87) PCT Pub. No.: WO2014/207072
PCT Pub. Date: Dec. 31, 2014

(65) Prior Publication Data
US 2016/0153068 A1    Jun. 2, 2016

(30) Foreign Application Priority Data

Jun. 26, 2013 (GB) .................................. 1311344.4

(51) Int. Cl.
*C22B 21/00* (2006.01)
(52) U.S. Cl.
CPC ...... *C22B 21/0092* (2013.01); *C22B 21/0069* (2013.01); *Y02P 10/218* (2015.11)
(58) Field of Classification Search
CPC .................. C22B 21/0069; C22B 21/0092
USPC .... 266/233, 227, 228, 205, 44, 275; 75/678, 75/655, 672, 10.35
See application file for complete search history.

(56) References Cited

U.S. PATENT DOCUMENTS

| 4,767,452 A * | 8/1988 | Stenzel | C22L 39/02 266/145 |
| 4,960,460 A | 10/1990 | Dube et al. | |
| 6,136,263 A * | 10/2000 | Bramley | C22B 7/04 266/205 |
| 6,159,269 A * | 12/2000 | Drouet | C22B 7/003 266/87 |

(Continued)

FOREIGN PATENT DOCUMENTS

| EP | 0322207 | 6/1989 |
| WO | 97/39155 | 10/1997 |

OTHER PUBLICATIONS

Ruff WS, "From waste to valuable raw material refinement of aluminium dross", Aluminium, 1998, pp. 74: 1-2.

(Continued)

*Primary Examiner* — Scott R Kastler
*Assistant Examiner* — Michael Aboagye
(74) *Attorney, Agent, or Firm* — Greenblum & Bernstein, P.L.C.

(57) ABSTRACT

A process and apparatus for recovering aluminum metal from aluminum dross, the process including skimming aluminum dross from a furnace containing molten aluminum into a dross processing receptacle, transporting and mounting the dross filled receptacle to a rocking device, and rocking the receptacle until aluminum pours from discharging outlets in the receptacle into a container for catching the molten aluminum which is placed underneath the rocking device.

30 Claims, 5 Drawing Sheets

(56) References Cited

U.S. PATENT DOCUMENTS

| | | | | |
|---|---|---|---|---|
| 6,767,382 B2 * | 7/2004 | Stratigos | ................ | C22B 7/005 266/157 |
| 7,935,302 B1 * | 5/2011 | Groteke | ................... | C22B 7/04 266/205 |
| 2004/0050211 A1 | 3/2004 | Stratigos et al. | | |

OTHER PUBLICATIONS

Gripenberg H et al., "Salt-free dross processing with Alurec—two years experience", Light Metals, 1997, pp. 1171-1175.
Lavoie S et al., "A salt-free treatment of aluminium dross using plasma heating", J Metals, 1991, pp. 54-55.
Drouet et al., "Drosrite Salt-Free Processing of Hot Aluminum Dross", Recycling of Metals and Engineered Materials, Aug. 1, 2000, pp. 1135-1145.
Unlu et al., "Comparison of salt-free aluminum dross process", Resources conservation and Recycling, Elsevier Science Publisher, Jul. 1, 2002, pp. 61-72, vol. 36, No. 1.
Peterson et al., "A historical perspective on dross processing", Materials Science Forum, Jan. 1, 2011, pp. 13-23, vol. 693.
N.N., "Aluminum Dross Recycled into Fertilizer in New Zealand", Waste Management World, Oct. 27, 2011, PP. URL:http://www.waste-magagement-world.com/articles/2011/10/aluminium-dross-recycled-intofertilizier-in-new-zealand.html.
International Search Report issued PCT/EP2014/063452, dated Oct. 9, 2014.

\* cited by examiner

Figure 1

Top side view

Side wall view

End wall view

Top side view (42 not shown)

Front facing view (44 not shown)   Side view

Fig 4

ALUMINIUM DROSS PROCESSING

TECHNICAL FIELD

The present invention relates to an apparatus and process for processing aluminium dross.

BACKGROUND ART

Every primary aluminium producer, remelter or recycler of aluminium is faced with the fact that in all processes involving molten aluminium in contact with air dross is formed as the molten aluminium metal reacts with the furnace atmosphere [1]. By 'aluminium' in this context, we include aluminium alloyed with various alloying metals. 'Dross' as used herein refers to the mass of solid impurities floating on the surface of the molten aluminium metal in a furnace, comprising aluminium oxide and trapped recoverable aluminium metal. Dross generally represents from 1 to 10% by weight of the melt and depending on the process, may contain, on average, between 30 and 60% by weight free aluminium metal dispersed in an oxide layer, although higher and lower contents may occur [2][3]. Dross freshly removed from the furnace is of course hot, but most dross processing methods are practiced on dross that has been allowed to cool, often being transported long distances for processing.

Traditionally, the recovery of the aluminium metal has been performed using the rotary salt furnace (RSF) process. In the RSF process, an oil or gas fired furnace is charged with the dross, and a salt flux (up to 50% of the dross weight) is added. The salt protects the metal from the reactive atmosphere and facilitates agglomeration and separation of the metal, thereby increasing metal recovery. Using salt produces significant disadvantages such as increased costs, environmental hazards and safety hazards. The non-metallic by-product, referred to as the "salt cake", is a mixture of aluminium oxides and aluminium nitrides, metal and salts. More than 1 ton of salt cake is produced for every ton of dross treated and is a growing environmental concern [4]. Stricter regulations, particularly in Europe, have resulted in the outlawing of landfill disposal of the salt cake. As such significant research and development activities have been conducted at different locations around the world with the objective of developing a salt-free process.

The Alcan Plasma Arc Dross Treatment Process

U.S. Pat. No. 4,960,460 discloses the Alcan plasma arc dross treatment process. Instead of using a gas or fuel burner, as is the case for the RSF, a plasma torch is used to provide the required heat for heating the charge in a rotary furnace. The torch is mounted on the charging door of the rotary furnace, which allows close control of the atmospheric composition. The plasma torch consists of two water-cooled internal electrodes separated by a small gap through which the process gas, such as air or nitrogen, is continuously injected. The cold dross is charged, the door is closed and the application of high voltage initiates an electric arc between the torch electrodes. The arc heats the gas to a very high temperature, and the charge is heated to 700-800° C. while the furnace is rotated. During heating of the dross by the plasma arc, which operates with air or nitrogen as the process gas, further oxides and nitrides are formed as the plasma gases react with some of the free metal contained in the dross. The rotation of the furnace provides mechanical stirring that ruptures the oxide film, freeing molten metal and improving metal recovery. The oxide portion of the dross, termed non-metallic product (NMP), is a greyish powder containing mostly alumina with variable quantities of aluminium nitride and magnesium oxide depending on the alloy composition [5]. This process requires high maintenance as the torch has to be removed periodically for electrode maintenance.

The Hydro-Quebec DROSCAR Graphite Arc Process

DROSCAR uses a DC electric arc, stretched and maintained between two graphite electrodes, to heat the charge above the aluminium melting point. The energy transfer mechanism is mainly radiation from the arc and conduction between the heated refractories and the charge. The furnace rotates during heating of the dross to provide mechanical stirring. The rotation also prevents formation of hot spots on the charge or refractories, and improves energy transfer. On completion of heating, the metal is tapped from the furnace through a side tap hole [6]. Since this process uses a graphite arc, there is no need for cooling water and maintenance is not as intensive as is the case for the plasma arc technology.

The ALUREC Process

The ALUREC process uses a rotary tiltable converter type furnace comprising an oxy-fuel burner and an exhaust gas port located on the same side of the furnace. This design produces high-energy efficiency and allows good control of the furnace atmosphere [4]. The oxy-fuel burner heats the converter refractory wall in a short time to about 1000° C. Through furnace rotation, the heat is transferred to the charge by conduction, and the heat is further distributed within the charge by mixing. Heat is also transferred through direct radiation from the flame to the charge. The metal is collected at the bottom of the converter, and a solid NMP floats on top. The metal is tapped separately from the NMP and can be returned directly into the melting or holding furnaces or cast into sows or T-ingots. The NMP is discharged through the converter mouth [6]. The exhaust gas from the oxygen-fuel burner does not contain nitrogen and the volume of exhaust gas is small. The reduced exhaust gas volume and the increased flame temperature results in a more energy efficient process.

The ECOCENT Process

In the ECOCENT process hot dross is fed without any fluxing salt additions into a converter where the relevant parameters for separation such as temperature and viscosity can be adjusted [7]. In addition, large lumps of dross are crushed into smaller pieces in order to improve the later separation of the metal. After homogenizing and adjusting the temperature the hot dross is poured as quickly as possible into a centrifuge. In the ladle or alternatively in the mould of the centrifuge the centrifugal forces are used for the separation of the metal from the aluminium oxide, the major constituents of the dross. As soon as the centrifuging is finished the liquid aluminium can be poured back into the furnace or can be used for ingot pouring. As this process utilises the inherent energy of the hot dross no additional energy input is required, resulting in less than 50% energy consumption as compared to more conventional dross processing techniques.

The DROSRITE Process

WO 97/39155 discloses the DROSRITE process for processing aluminium dross. Hot dross is charged to a preheated refractory-lined rotary furnace immediately after skimming from the aluminium holding furnace. The DROSRITE furnace is sealed and maintained under an argon atmosphere. The furnace is rotated, as it is necessary to gently tumble the charge. The tap hole is opened, and the metal is poured into the receiving vessel or ladle. A controlled amount of oxygen is then injected into the furnace cavity, burning some of the non-recoverable aluminium metal contained in the residue in order to increase the temperature to target value, typically in the range of 800-900° C., at which time oxygen injection is stopped. This process does not require any external energy input; process energy is extracted from the solid residue, stored in the furnace refractory wall, and released to the next batch of fresh dross.

The abovementioned dross processing processes either require the input of significant amounts of external energy or require complex and expensive apparatus. In the Ecocent and Drosrite processes energy requirements are greatly reduced, however the initial capital costs and running costs are high. Thus, there is clearly a requirement for an energy efficient dross processing process and apparatus which does not use fluxing salts or complex, expensive apparatus.

SUMMARY OF THE INVENTION

The present invention now provides an aluminium dross processing process which is energy efficient and does not need fluxing salts, and can used a simple, low cost apparatus in said process.

In a first aspect, the present invention relates to a process for recovering aluminium metal from aluminium dross by processing of said aluminium dross, said process comprising:
transporting hot dross from a furnace containing molten aluminium producing said dross, said hot dross comprising oxides and an initial content of metallic aluminium and being contained in and part filling a dross processing receptacle;
said dross processing receptacle comprising opposed end walls which each have at least one outlet for pouring molten aluminium from the receptacle, said outlets being positioned at a height part way between a floor of said receptacle and a removable lid closing said receptacle;
placing said dross processing receptacle onto a rocking device for rocking said receptacle to lower alternately said opposed ends of the receptacle;
operating the rocking device to lower alternately said opposed ends of the receptacle to pour molten aluminium out of said outlets; and
continuing said rocking and pouring until at least 70 wt % of the initial content of metallic aluminium has been poured.

In a preferred embodiment of the invention said hot dross fills up to 40% of the total internal volume of said dross processing receptacle, up to 50% of the total internal volume of said dross processing receptacle, up to 60% of the total internal volume of said dross processing receptacle or up to 70% of the total internal volume of said dross processing receptacle.

In another preferred embodiment of the invention the temperature of said hot dross is between 600° C. and 860° C., preferably between 630° C. and 830° C., more preferably between 650° C. and 810° C. and most preferably between 680° C. and 780° C.

Hot dross at a temperature above a preferred temperature range of the invention may be reduced to a temperature within said temperature range by adding and mixing pre-cooled dross, wherein the temperature of said pre-cooled dross is less than 680° C. Said pre-cooled dross is preferably of the same metallic alloy content as said hot dross.

Hot dross at a temperature below a preferred temperature range of the invention may be increased to a temperature within said temperature range by blowing air into said hot dross.

In another preferred embodiment of the invention said rocking device lowers a said opposed end such that the floor of said receptacle is at an angle of between 65° and 85°, and preferably between 70° and 80° from the horizontal position.

In another preferred embodiment of the invention said rocking and pouring is continued until at least 80 wt %, and preferably at least 90 wt %, of the initial content of metallic aluminium has been poured.

In another preferred embodiment of the invention said rocking device is located within 500 m, preferably 250 m, more preferably 100 m, and most preferably 50 m of the furnace from which said hot dross originated.

In another preferred embodiment of the invention said poured metallic aluminium may be returned to said furnace from which said hot dross originated, or may be mixed with a batch of aluminium of substantially the same alloy content.

In another aspect, the present invention relates to an apparatus for recovering aluminium metal from aluminium dross, said apparatus comprising:
a receptacle, wherein said receptacle comprises two opposed end walls, two opposed side walls, a floor, and a removable lid, wherein said opposed end walls each comprise at least one outlet for pouring molten aluminium from said receptacle, said outlet or outlets being positioned at a height part way between said floor of said receptacle and said lid closing said receptacle;
a rocking device mounted on a support structure, wherein said rocking device comprises a mounting and a rocking mechanism for rocking said mounting, wherein said mounting is for mounting the receptacle to said rocking device; and
a container for catching molten aluminium which pours from said outlets.

In a preferred embodiment of the invention, at least portions of said opposed walls adjacent the floor are convergent in the direction of the floor. Preferably, said opposed walls are parallel in an upper portion and are convergent in the direction of the floor in a lower portion such that the upper portion of said receptacle is cuboidal shaped and the lower portion of said receptacle is frusto-pyramidal shaped. Preferably still, said outlets for pouring molten aluminium from said receptacle are positioned in said opposed end walls at a junction formed between said upper portion and said lower portion of said receptacle.

In another preferred embodiment of the invention said removable lid is attached to said receptacle by a fastening mechanism.

In another preferred embodiment of the invention said receptacle further comprises at least one mounting channel for receiving a mounting projection of said mounting. Preferably, said mounting for mounting said receptacle to said rocking device comprises at least one horizontally projecting protrusion for engaging the mounting channel.

In another preferred embodiment of the invention said receptacle further comprises external cooling fins.

In another preferred embodiment of the invention said removable lid further comprises a central support beam attached to said lid by brackets such that said central support beam is free to rotate about a longitudinal axis, and wherein at least one said mounting channel is attached to the upper side of said central support beam.

In another preferred embodiment of the invention said rocking mechanism is a hydraulic device or an electric motor.

In another preferred embodiment of the invention the receptacle, mounting and container of the apparatus for recovering aluminium metal from aluminium dross are enclosed in a housing, wherein said housing is an insulated box, preferably an insulated steel box, and wherein said housing comprises a venting system.

DROSS PROCESSING PROCESS

A process for processing aluminium dross according to the invention may essentially be performed as follows:

A receptacle is placed in front of the furnace. Hot dross is skimmed directly from the furnace into said receptacle until said receptacle is approximately half full. The elapsed time for dross skimming (the time taken to approximately half fill the receptacle) is preferably less than 8 minutes and more preferably less than 5 minutes in order to minimize the reaction of the hot dross with oxygen, which can cause thermiting, resulting in a "burn loss" of available aluminium in the dross, and to minimise the amount of ambient air introduced to, and heat loss from, the furnace. Furthermore, minimising the skimming time minimises the loss of heat from the skimmed hot dross.

The temperature of the skimmed dross can be qualitatively evaluated by visual observation by an operator. For optimal process conditions the hot dross is preferably yellow/orange in colour. If the dross is below the preferred optimal temperature for the process (less than 680° C.) then the dross has a deep red colour whereas if the dross is above the preferred optimal temperature (more than 780° C.) the dross glows bright yellow/white. In the case that the dross is too cold the free aluminium metal begins to solidify, thus air is blown into the receptacle to cause thermiting of some of the free aluminium metal which increases the temperature and keeps the free aluminium metal in the molten state. In the case that the dross is too hot the free aluminium starts thermiting, pre-cooled dross, preferably of the same alloy content, is added to the dross processing receptacle and mixed with the hot dross to reduce the temperature and minimise burn loss. Alternatively, instrumental temperature measurement means can be used. However, the visual observation dross temperature evaluation method obviates the need for time consuming temperature measurements.

Once the dross is considered to be at the preferred temperature for the process (yellow/orange in colour, approximately 680-780° C.) a lid is mounted onto the receptacle and optionally secured using a fastening mechanism. The closed dross processing receptacle is then mounted onto a rocking device. The elapsed time between skimming and mounting to the rocking device is preferably less than 8 minutes and more preferably less than 5 minutes.

The receptacle is slowly rocked by the rocking device (controlled by an operator operating a controller, lowering one end of said receptacle such that the floor of said receptacle is at an angle of approximately 70° to 80° from the horizontal position) until aluminium pours from discharging outlets in the receptacle into a container for catching the molten aluminium which is placed underneath the rocking device. When the molten aluminium stops flowing into the container, the operator slowly rocks the receptacle in the opposite direction to encourage agglomeration of the molten aluminium in the receptacle and to encourage continuation of metal flow into the container. This process is repeated until no further aluminium flows from the receptacle; at this stage up 90% of the recoverable aluminium in the hot dross has been recovered in the container. The processing time at the rocking device varies depending on the alloy composition and is typically between 15 and 45 minutes.

Rocking of the receptacle from one end-lowered point to the other may take up to 60 seconds. The angular rotation rate is for instance 4 to 8°/second. Over vigorous disturbances of the dross, as occurs in some prior art processes, can compact the dross and lock in molten aluminium which no longer drains sufficiently freely to be recovered.

The recovered metal is allowed to cool in the container. Once it solidifies, the aluminium is weighed and returned to the furnace from which it originated; due to the quick turnaround time the composition of the aluminium metal is substantially the same as the metal within the furnace from which it came. Alternatively said recovered metal may be mixed with a batch of aluminium of substantially the same alloy content or may be used to alter the composition of a batch of different composition.

After hot dross processing, the dross receptacle is removed from the rocking device and the residual dross is transferred to a cooling bay, where it is forced-cooled and weighed prior to being transported to the second stage processing facility. The second stage cold dross processing processes the remaining dross using methods known in the art: mechanical processing (i.e. grinding, crushing, size separation) and electric current separation ('eddy current separation').

Alternatively, the dross processing process may be automated. Such an automated process may be performed as follows. A dross processing receptacle (including lid) may be transported to the front of the furnace via a floor-embedded rail system. Once the receptacle is in front of the furnace the lid may be lifted by a robotic arm, triggering the start of the skimming process. The rail system may be a loop track between the furnace, weighting bridge, and the dross processing area where the previously described rotator installation is located.

A sensor may be used to measure the filling level in the receptacle and send a signal to application software (running on a computer embedded operating system) when the desired dross volume is reached. The sensor may be any suitable fill level sensor known in the art. The skimming may be stopped while the receptacle is sealed with the corresponding lid and then transported to the weighting bridge. The next empty receptacle moves in front of the furnace via the rail system and the skimming process may continue.

The filled receptacles may be automatically weighed before moving to the dross processing area.

For each skimming operation, an operator may select a dross processing program (programmed into the application software) based on the alloy composition and the predicted temperature behavior of the dross. The program may include sensory information on the dross temperature and previously determined receptacle filling weight.

The outflow of liquid metal through the outlet of the dross receptacle may be monitored by, for example, a light barrier or weight sensor underneath the container for catching the molten aluminium. The monitoring device sends a signal to the application software which instructs the rotating equipment to resume motion or to stop moving to allow outpour of metal.

The dross processing receptacle may be equipped with a temperature monitoring device, preferably a thermocouple, for monitoring the temperature of the dross. For as long as the dross is at a temperature within the preferred temperature range of 630° C. and 860° C. no intervention will occur.

Should the temperature exceed 860° C. then the temperature monitoring device sends a signal to the application software which results in the release of argon gas into the dross processing receptacle through its lid in order to stop thermiting of said dross and thereby allowing cooling to below 860° C.

Should the temperature fall below 630° C. then the monitoring device sends a signal to the application software which results in the release of oxygen into the dross processing receptacle to initiate burning of free aluminium metal (thermiting) to reheat the dross to within the preferred temperature range.

Should the device which monitors the outflow of metal from the receptacle fail to record any metal flow for 3 rotation cycles the software application determines the process to be finished. The dross processing receptacle may then be removed from the rocking device and transported to the designated cooling bay.

Preferred Embodiment of the Dross Processing Receptacle

Figure 1:
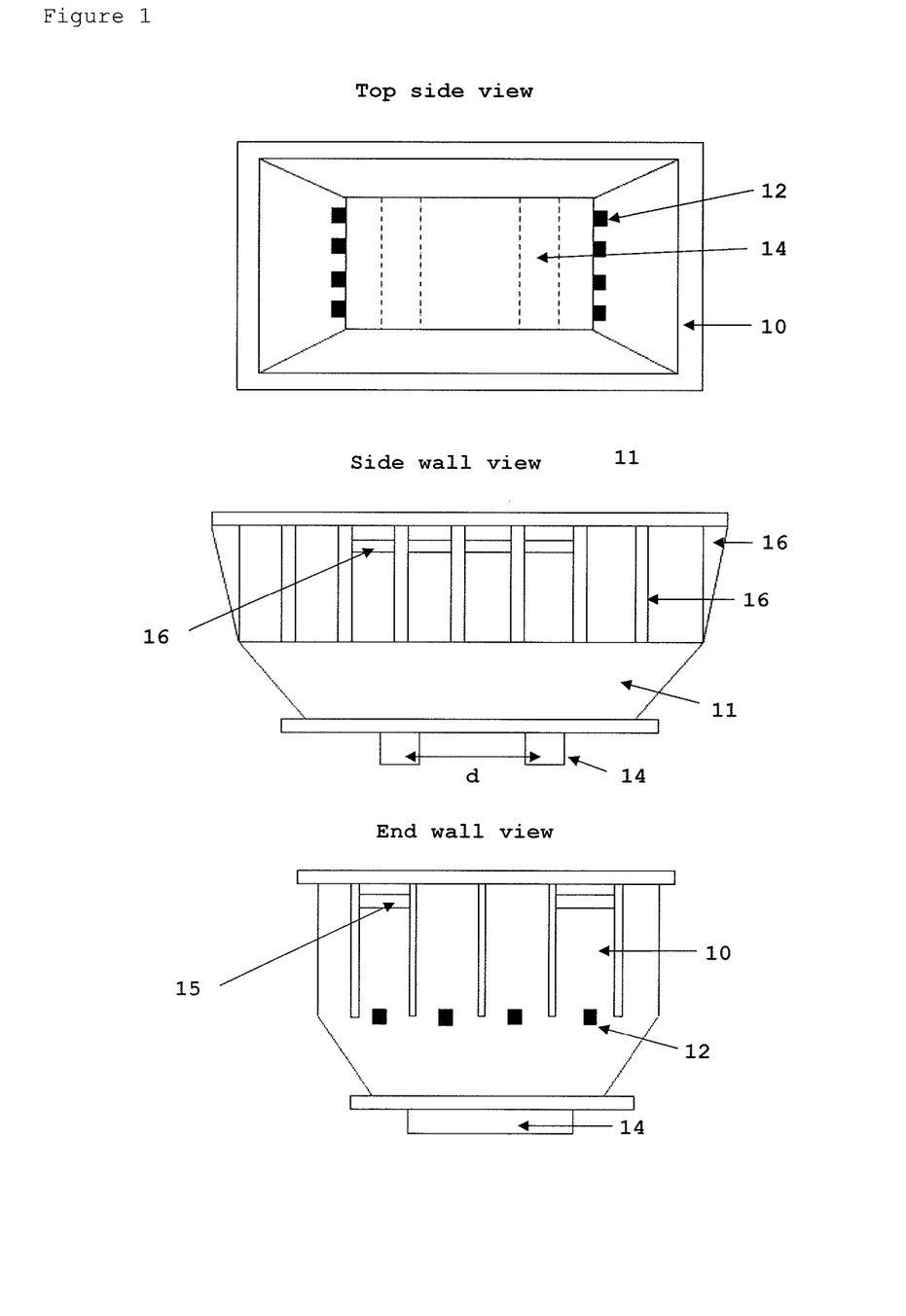
FIG. 1. Preferred embodiment of the dross processing receptacle.

FIG. 1 shows a preferred embodiment of a receptacle wherein the opposed walls 10, 11 of said receptacle are parallel in an upper portion and are convergent in the direction of the floor in a lower portion, such that the upper portion of said receptacle is cuboidal shaped and the lower portion is frusto-pyramidal shaped. This overall design reduces burning of the aluminium metal ('thermiting') whilst minimising heat loss from the hot dross.

The receptacle further comprises discharge outlets 12 for allowing the molten aluminium to exit the receptacle, said outlets being placed at a junction formed between said upper portion and said lower portion of the receptacle. During the dross processing process the receptacle is rocked to an angle of 70-80 degrees. At said time said junction becomes the lowest part of the receptacle (i.e. it is the point closest to the ground), thus it is the optimal position for the outlets as the molten aluminum will naturally pool at said position due to gravity, which consequently maximises the quantity of aluminium metal which can be discharged from the receptacle.

The dross processing receptacle may further comprise one or more mounting channels 14. In a preferred embodiment said mounting channels 14 are attached to the underside of said floor in said receptacle.

The dross processing receptacle may further comprise cooling fins 16 attached to the outer surface of the receptacle which disperse excess heat by increasing the surface area of the receptacle. Additionally, the cooling fins 16 reinforce the dross processing receptacle.

The dross processing receptacle may be made from any materials known in the art which are suitable for containing molten aluminium. Such a suitable material may be, but is not limited to, steel.

Figure 2:
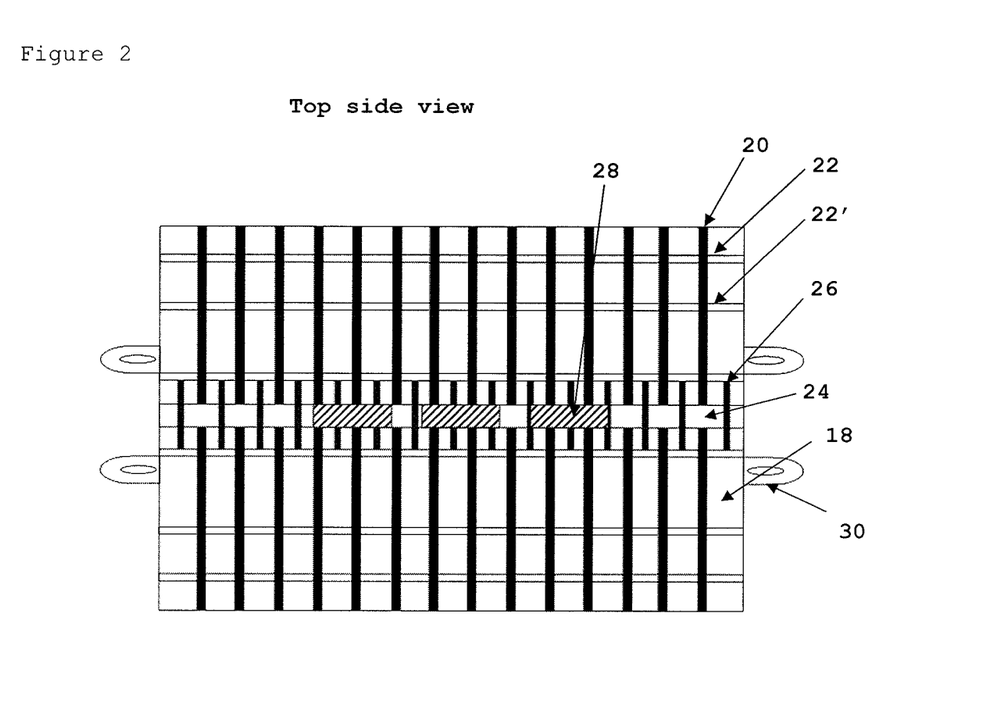
FIG. 2. Preferred embodiment of the lid for Dross processing receptacle.

Preferred Embodiment of the Removable Lid for the Dross Processing Receptacle FIG. 2 shows a preferred embodiment of the removable lid, wherein said lid comprises a base plate 18 to which may be attached cooling support fins 20 and transversal cooling support elements 22, 22'. Said cooling fins and cooling support elements may cool the lid by increasing the surface area of the lid, thus providing a larger area through which excess heat can be dissipated. Additionally, the cooling support fins 20 and cooling support elements 22, 22' may aid in reducing heat induced deformation of the lid.

A central support beam 24 may be attached to the base plate 18 by brackets 26 such that said central support beam longitudinally bisects said base plate. The brackets and central support beam can be removed and/or replaced during maintenance of the lid. To the upper side of the central support beam is attached one or more mounting channels 14 which, for example, allows an operator operating a fork lift truck to lift the lid and place it on top of the receptacle. The central support beam can rotate about its longitudinal axis, which eases the process by which the lid is mounted onto the receptacle.

Each of the components of the lid may be made from any materials known in the art which are suitable for containing molten aluminium. Such a suitable material may be, but is not limited to, steel.

Fastening Mechanism for Attaching the Lid to the Dross Processing Receptacle

As mentioned supra, the lid may be fastened to the receptacle using a fastening mechanism. Such a fastening mechanism may be any suitable mechanism known in the art which allows two heavy objects to be reversibly joined. The fastening mechanism comprises at least two fasteners, and both the dross processing receptacle and the removable lid further comprise brackets which allow the fasteners to attach to both the receptacle and the lid, thereby fastening the lid to the receptacle. Such said fasteners may be, but are not limited to, threaded fasteners.

In a preferred embodiment, the dross processing receptacle comprises two J-bolt struts 15 attached to the outside face of each end wall 10, the lid comprises two J-bolt brackets 30 attached to each end of the lid, and said lid is fastened to said receptacle by four J-bolts, wherein the U-section of each said J-bolt is hooked onto each said strut 15, the straight section of each said J-bolt is passed through the gap in each said bracket 30 and each said J-bolt is secured by attaching a threaded nut to a threaded end section of said straight section of each said J-bolt. J-bolt fastening mechanisms of this type are known in the art.

Preferred Embodiment of the Rocking Device

Figure 3:
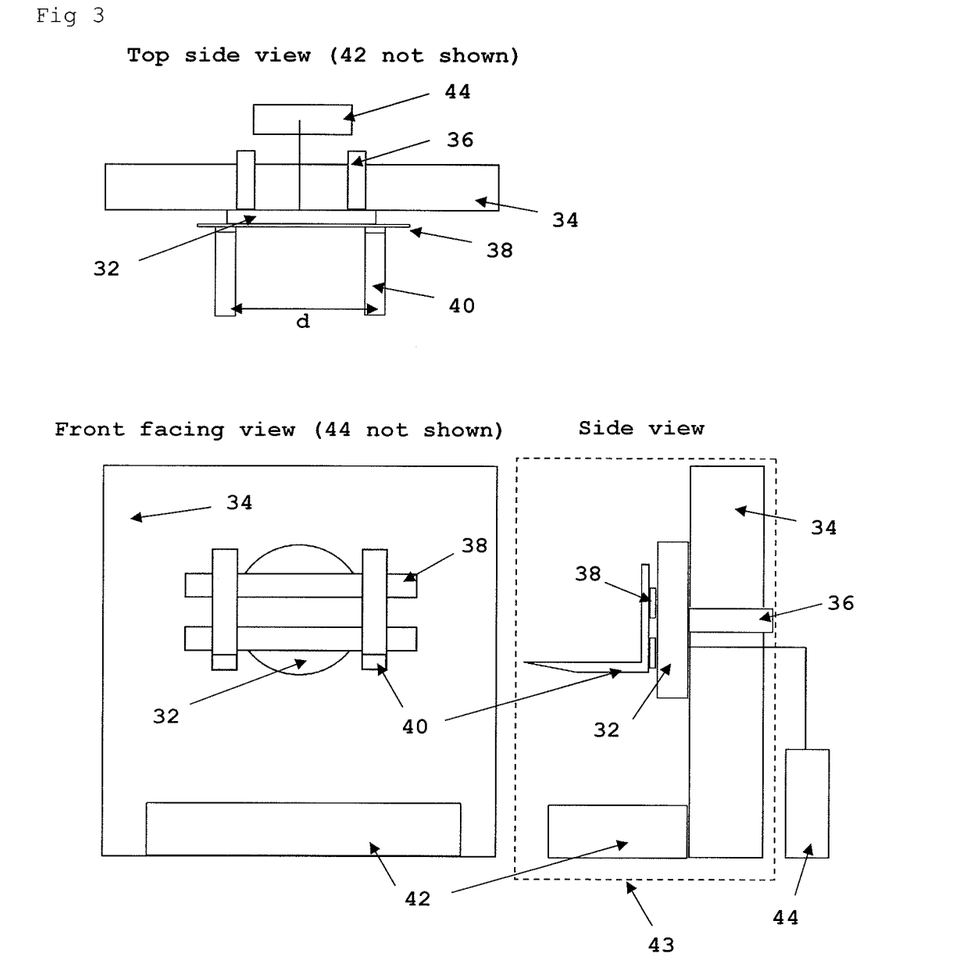
FIG. 3. Preferred embodiment of the rocking device.

FIG. 3 shows a preferred embodiment of the rocking device, wherein said rocking device comprises a mounting mounted to a concrete support structure 34 by concrete supports 36. Said mounting comprises a turntable 32, to which are attached two mounting supports 38, to which are attached two horizontally projecting protrusions 40. The horizontally projecting protrusions are preferably 'L' shaped such that said protrusions may be securely attached to said mounting supports.

In a preferred embodiment of the present invention the receptacle comprises two mounting channels 14 attached to the underside of the floor and the rocking device comprises two horizontally projecting protrusions 40, wherein said channels 14 and said protrusions 40 are each separated by a distance d such that said horizontally projecting protrusions can insert into the each said mounting channel, thus allowing said receptacle to be mounted to said rocking device.

A container 42 is positioned underneath the rocking device such that it collects the molten aluminium metal which falls from the dross processing receptacle during operation. Said container may be any container which is suitable for containing molten aluminium.

In a preferred embodiment, said rocking mechanism 44 is a hydraulic system, wherein said hydraulic system rotates said mounting. An operator can manually control the rate of rocking of a mounted dross processing receptacle by controlling the hydraulic system which rotates said mounting.

In yet a further preferred embodiment, said rocking mechanism 44 is an electric motor, preferably comprising an integrated gearbox, wherein said electric motor rotates said mounting. An operator can manually control the rate of rocking of a mounted dross processing receptacle by controlling the electric motor which rotates said mounting. Preferably, the electric motor and drivetrain of the rocking device comprises 3 parts: 1) a three phase reversible motor; 2) a gear unit; and 3) a brake/clutch unit which transmits power from the motor to the gear unit. The three phase reversible motor preferably can rotate at least 4.5 tonnes of weight, and the gear unit is preferably reversible (without a reverse lock) to aid in the rocking of the dross processing apparatus during the dross processing process.

Semi-Automated Rotating Aluminium Dross Housing (SARAH)

Figure 4:
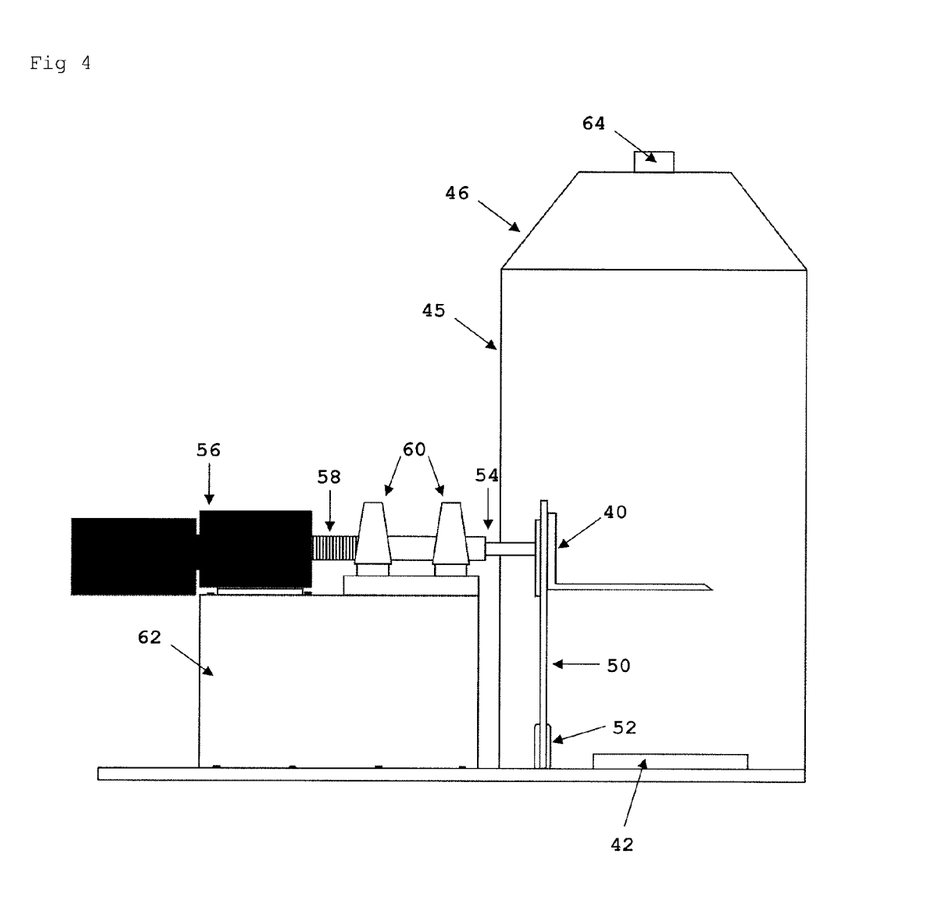
FIG. 4. Side on view of the semi-automated rotating aluminium dross housing (SARAH) unit.
Figure 5:
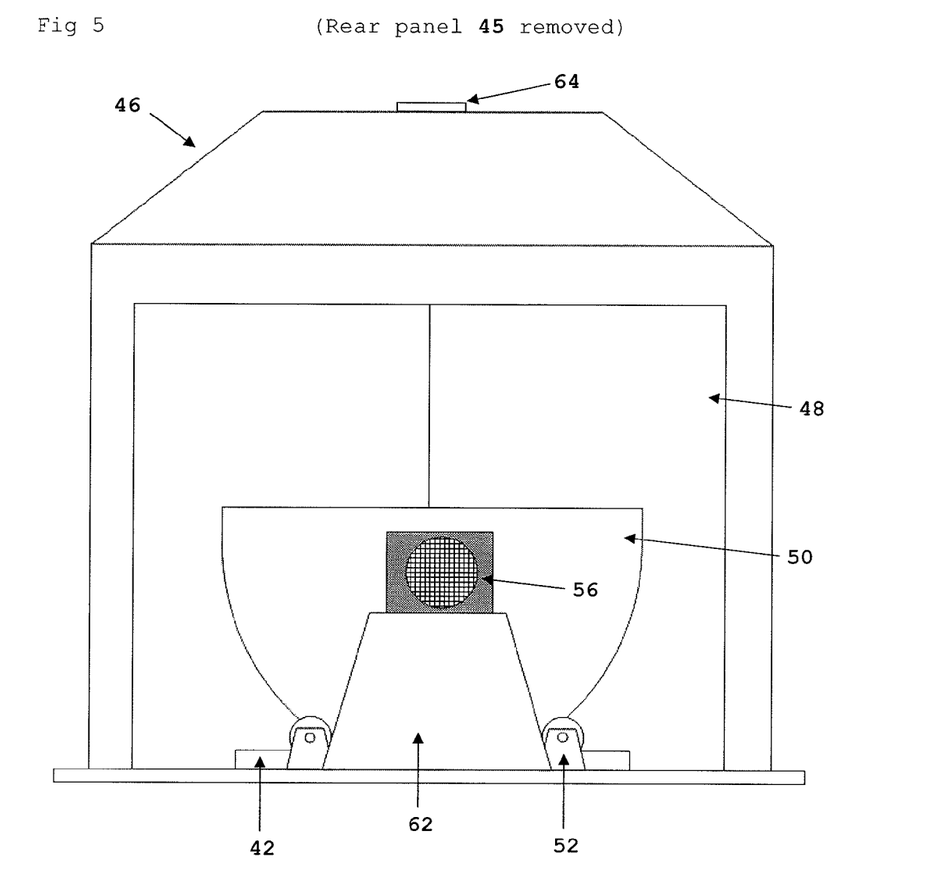
FIG. 5. Rear side view of the semi-automated rotating aluminium dross housing (SARAH) unit. The rear wall panel 45 has been removed for illustrative purposes only.

FIG. 4 shows a side on view a of a further preferred embodiment of the aluminium dross processing apparatus for use in the dross processing process, namely the semi-automated rotating aluminium dross housing (SARAH) unit. FIG. 5 shows a rear side view of the SARAH unit, with the rear wall panel 45 of the SARAH unit removed for illustrative purposes only.

The SARAH unit comprises an insulated box 46, preferably an insulated steel box, which comprises at least one, preferably two outwardly swinging doors 48 hinged on an outer vertical edge, wherein each of said doors may comprise a window (not shown) through which an operator may observe the dross processing process which occurs therein.

A closed-circuit TV (CCTV) system (not shown) may be installed inside or outside of the SARAH unit to monitor the dross processing process. Preferably, said CCTV system comprises two cameras, wherein each camera is installed on the outer left or right wall of the insulated box of the SARAH unit, respectively, and which said cameras are positioned such that they observe the dross processing process through separately installed windows (not shown), said windows being located in the left and right walls of the insulated box of the SARAH unit, respectively. The cameras may be connected to a monitor located outside of the SARAH unit such that an operator may monitor and control the aluminium metal flow from the dross processing receptacle.

The SARAH unit may incorporate the dross processing apparatus as described above. For example, the rocking device (turntable 32, concrete support structure 34, concrete supports 36, mounting supports 38, horizontally projecting protrusions 40 and container 42) may optionally be located within the insulated box of the SARAH unit, with the rocking mechanism 44 placed outside of said insulated box, as is shown schematically by dashed box 43 (which represents the insulated box, see side view of FIG. 3). Alternatively, the SARAH unit may optionally comprise one or more of the following components, either in combination with, or as an alternative selection to, one or more of the components of the dross processing apparatus as described above.

The rocking device of the SARAH unit may comprise a mounting in the form of a rotating plate 50, preferably a rotating steel plate, located within the insulated box 46 of the SARAH unit, upon which is mounted at least one, preferably two horizontally projecting protrusions 40. In use the horizontally projecting protrusion(s) insert into the mounting channel(s) 14 attached to the underside of the floor of the dross processing receptacle, thus allowing said receptacle to be mounted to said rocking device, and said rocking device rocks the mounted dross processing receptacle such that aluminium pours from the discharge outlets 12 in the receptacle.

A container 42 is positioned underneath the rocking device such that it collects the molten aluminium metal which falls from the discharge outlets 12 of dross processing receptacle during operation. Said container 42 may be any container which is suitable for containing molten aluminium.

The rotating plate preferably sits on guide wheels 52, said guide wheels aiding the rocking device by bearing a portion of the weight of the dross processing receptacle during the dross processing process, and assisting in controlling the direction of rotation. The rotating plate may be connected to a drive shaft 54 which in turn may be connected, preferably via a viscous coupling, to a rocking mechanism 56, said rocking mechanism preferably being an electric motor, said electric motor preferably comprising an integrated gearbox, and said rocking mechanism being located externally of the insulated box 46.

The drive shaft 54 is optionally connected to the rocking mechanism via a flexible coupling 58, which said coupling may be easily replaced if damaged. The flexible coupling provides cushioning against shocks during start-up and stopping of the dross processing process, thereby prolonging the lifetime of the operative mechanical parts of the apparatus.

The drive shaft may be supported by a plummer block housing assembly 60 which can withstand heavy loads, preferably withstanding at least 4.5 tonnes of weight. Plummer block housing assemblies of this type are known in the art, and may be made from any suitable material, such as cast iron.

The rocking mechanism and drive shaft assembly is preferably mounted on a wide base 62. Using a wide base evenly distributes the weight load across the base. The base 62 is preferably anchored to the flooring via bolts.

Fumes and dust from the hot dross are preferably vented from within the SARAH unit by means of a venting conduit 64 located in the upper surface of the insulated box, said venting conduit preferably being a louvered hood, which is preferably connected (via ducting) to a compact de-dusting unit, preferably a CE certified Ringler de-dusting unit, which is installed adjacent to the SARAH unit. The SARAH venting system may be a sealed system such that the gases and particulate matter released during the dross processing process are contained, collected and/or processed, thereby preventing leakage of harmful gases and particulates from the SARAH unit.

As the SARAH unit is an enclosed system, regulation of the environment therein is facilitated, thereby minimising loss of recoverable aluminium through undesired "burn loss" through uncontrolled excessive thermiting of aluminium metal in the dross. Regulation of the environment may be achieved through controlling the level of oxygen in the atmosphere within the SARAH unit. For example, this may be achieved by providing an input gas to the SARAH unit, said input gas comprising a pre-selected oxygen to inert gas (such as, but not limited to, nitrogen or argon) ratio, however any suitable method known in the art for environmental control of an enclosed system may be employed.

Advantages Over the Current Art

By combining the herein described hot dross processing method with cold dross processing methods known in the art for processing the aluminium depleted dross, maximal recovery of recoverable aluminium metal from the dross is possible and all of the remaining aluminium dross is recycled, thus there is no need for landfilling and no hazardous salt cake is produced. Furthermore, the process is very cost effective: it is highly energy efficient as the hot dross processing process does not require any external input of energy, there are no waste disposal costs, and equipment/apparatus maintenance costs are low.

Additionally, due to the simplicity of the apparatus, it is possible to run the hot dross processing process continuously. For example, if 3 dross processing receptacles as described herein are used in rotation and one and/or two are out of use for cleaning/maintenance/decontamination purposes then there is still one available for dross processing. This is a significant improvement over the current art as there is little, if any, need for apparatus down time due to cleaning/maintenance/decontamination.

Furthermore, the SARAH unit may reduce safety concerns as the dross processing may occur in a contained environment, thereby minimising operator and environmental exposure to potentially harmful gases and particulate substances.

Example of the Dross Processing Process

Skimming: 834 kg dross
Alloy: 3105 series
Recoverable aluminium in dross: 378 kg
Aluminium recovered: 337 kg
Yield: 89%

The quantity of recoverable aluminium in the dross was determined by methods known in the art, such as that disclosed in WO 2010/027267 and WO 01/20300.

Aluminium dross was skimmed into the specially designed dross processing receptacle using an operator operated fork lift truck equipped with a skimming tool until the receptacle was approximately half-filled. The half-filled dross processing receptacle was transported to the designated dross processing area by an operator operated fork lift truck.

An operator qualitatively examined the temperature of the dross through visual observation and altered the temperature until the dross glowed yellow/orange in colour.

Once the preferred processing temperature range was reached, the lid was mounted onto the receptacle by an operator using a forklift truck and manually secured in place using 4 J-bolts.

The sealed dross processing receptacle was then mounted onto the rocking device by an operator operated forklift truck. The operator then rocked the dross processing receptacle, such that the floor of said receptacle was at an angle of between 70 and 80 degrees from the horizontal, until molten aluminium metal began to pour from the discharging outlets into the container positioned under the rotator. When the flow of aluminium metal ceased to pour out of the discharging outlets, the receptacle was tilted in the opposite direction, again to an angle of between 70 and 80 degrees, until molten aluminium metal again began to pour from the discharging outlets in the opposite end wall.

Once the process was complete the aluminium in the container was allowed to cool naturally and then transported to a calibrated scale. The operator recorded the gross weight of the metal and container (937 kg). The empty container had been predetermined (600 kg) and the net metal weight was determined by the weight difference (337 kg). The residual aluminium oxide inside the dross processing receptacle was transported to a calibrated scale and an operator recorded the gross weight of the receptacle (1978 kg). The empty aluminium dross processing receptacle had been predetermined (1481 kg) and the net dross weight was determined by the weight difference (497 kg).

Furnace skimming=Net aluminium recovered 337 kg+net dross weight 497 kg=834 kg

% aluminium recovery=(aluminium recovered kg/recoverable aluminium in the dross kg)*100=(337/378)*100=89%

The residual aluminium dross inside the receptacle was transported to a secondary processing building where it was force-cooled by spreading on an insulated floor. Once cooled, the remaining aluminium metal in the dross was recovered using a mechanical separation system and electric current separation.

In this specification, unless expressly otherwise indicated, the word 'or' is used in the sense of an operator that returns a true value when either or both of the stated conditions is met, as opposed to the operator 'exclusive or' which requires that only one of the conditions is met. The word 'comprising' is used in the sense of 'including' rather than in to mean 'consisting of'. All prior teachings acknowledged above are hereby incorporated by reference. No acknowledgement of any prior published document herein should be taken to be an admission or representation that the teaching thereof was common general knowledge in Australia or elsewhere at the date hereof.

REFERENCES

[1] MFS Engineering Ltd Catalogs. Rotary Dross Cooling Systems. Switzerland: Kreuzlingen; 1997. p. 1-6.
[2] Ruff W S. From waste to valuable raw material refinement of aluminium dross. Aluminium 1998; 74:1-2.
[3] Gripenberg H, Mullerthann M, Jager N. Salt-free dross processing with Alurec—two years experience. Light Metals 1997:1171-1175.
[4] Gripenberg H, Grab H, Flesch G, Mullerthann M. Alurec—a new salt-free process. In: Quenean P B, Peterson R D (editors). Third International Symposium on Recycling of Metals and Engineered Materials, 12-15 Nov. 1995, Point Clear, Ala. The Mineral, Metals and Materials Society; 1995. p. 819-828.
[5] Lavoie S, Dube G. A salt-free treatment of aluminium dross using plasma heating. J Metals 1991; 2:54-55.
[6] Drouet M G, Meunier J, Laflamme C B, Handfleld M D, Biscaro A, Lemire C. A rotary arc furnace for aluminium dross processing. In: Quenean P B, Peterson R D (editors). Third International Symposium on Recycling of Metals and Engineered Materials, 12-15 Nov. 1995, Point Clear, Ala. The Mineral, Metals and Materials Society; 1995. p. 803-812.
[7] Kos B. A new concept for direct dross treatment by centrifuging of hot dross in compact type ecocent machines. Light Metals 1997:1167-9.

The invention claimed is:

1. A process for recovering aluminium metal from aluminium dross by processing of said aluminium dross, said process comprising:

transporting hot dross from a furnace containing molten aluminium producing said dross, said hot dross comprising oxides and an initial content of metallic aluminium and being contained in and part filling a dross processing receptacle;

said dross processing receptacle comprising two opposed end walls, two opposed side walls, a floor and a removable lid wherein said opposed end walls each comprise at least one outlet for pouring molten aluminium from the receptacle, said at least one outlet in each of said opposed end walls being positioned at a height part way between a floor of said receptacle and said lid closing said receptacle, and wherein said receptacle further comprises external cooling fins attached to an outer surface of the receptacle;

placing said dross processing receptacle onto a rocking device mounted on a support structure, wherein said rocking device comprises a mounting and a rocking mechanism for rocking said mounting, for rocking said receptacle to lower alternately said opposed ends of the receptacle;

operating the rocking device to lower alternately said opposed ends of the receptacle to pour molten aluminium out of said at least one outlet into a container for catching molten aluminium which pours from said at least one outlet; and continuing said rocking and pouring until at least 70 wt % of the initial content of metallic aluminium has been poured.

2. A process as claimed in claim 1, wherein said hot dross fills up to 40% of a total internal volume of said dross processing receptacle.

3. A process as claimed in claim 1, wherein said hot dross fills up to 50% of a total internal volume of said dross processing receptacle.

4. A process as claimed in claim 1, wherein said hot dross fills up to 60% of a total internal volume of said dross processing receptacle.

5. A process as claimed in claim 1, wherein said hot dross fills up to 70% of a total internal volume of said dross processing receptacle.

6. A process as claimed in claim 1, wherein a temperature of said hot dross is between 600° C. and 860° C.

7. A process as claimed in claim 1, wherein a temperature of said hot dross is between 630° C. and 830° C.

8. A process as claimed in claim 1, wherein a temperature of said hot dross is between 650° C. and 810° C.

9. A process as claimed in claim 1, wherein a temperature of said hot dross is between 680° C. and 780° C.

10. A process as claimed in claim 6, wherein said hot dross at a temperature above said temperature range is reduced to a temperature within said temperature range by adding and mixing pre-cooled dross, wherein a temperature of said pre-cooled dross is less than 680° C.

11. A process as claimed in claim 6, wherein said pre-cooled dross is of the same metallic alloy content as said hot dross.

12. A process as claimed in claim 6, wherein said hot dross at a temperature below said temperature range is increased to a temperature within said temperature range by blowing air into said hot dross.

13. A process as claimed in claim 1, wherein said rocking device lowers a said opposed end such that the floor of said receptacle is at an angle of between 65° and 85° from a horizontal position.

14. A process as claimed in claim 1, wherein said rocking device lowers a said opposed end such that the floor of said receptacle is at an angle of between 70° and 80° from a horizontal position.

15. A process as claimed in claim 1, wherein said rocking and pouring is continued until at least 80 wt % of the initial content of metallic aluminium has been poured.

16. A process as claimed in claim 1, wherein said rocking and pouring is continued until at least 90 wt % of the initial content of metallic aluminium has been poured.

17. A process as claimed in claim 1, wherein said rocking device is located within 500 m of the furnace from which said hot dross originated.

18. A process as claimed in claim 17, wherein said poured metallic aluminium is returned to said furnace from which said hot dross originated.

19. An apparatus for recovering aluminium metal from aluminium dross, said apparatus comprising:

a receptacle, wherein said receptacle comprises two opposed end walls, two opposed side walls, a floor, and a removable lid, wherein said opposed end walls each comprise at least one outlet for pouring molten aluminium from said receptacle, said at least one outlet in each of said opposed end walls being positioned at a height part way between said floor of said receptacle and said lid closing said receptacle, and wherein said receptacle further comprises external cooling fins attached to an outer surface of the receptacle;

a rocking device mounted on a support structure, wherein said rocking device comprises a mounting and a rocking mechanism for rocking said mounting, wherein said mounting is for mounting the receptacle to said rocking device; and a container for catching molten aluminium which pours from said at least one outlet.

20. An apparatus as claimed in claim 19, wherein at least portions of said opposed walls adjacent the floor are convergent in a direction of the floor.

21. An apparatus as claimed in claim 20, wherein said opposed walls are parallel in an upper portion and are convergent in the direction of the floor in a lower portion such that the upper portion of said receptacle is cuboidal shaped and the lower portion of said receptacle is frusto-pyramidal shaped.

22. An apparatus as claimed in claim 21, wherein said at least one outlet in each of said opposed end walls for pouring molten aluminium from said receptacle are positioned in said opposed end walls at a junction formed between said upper portion and said lower portion of said receptacle.

23. An apparatus as claimed in claim 19, wherein said removable lid is attached to said receptacle by a fastening mechanism.

24. An apparatus as claimed in claim 19, wherein said receptacle further comprises at least one mounting channel for receiving a mounting projection of said mounting.

25. An apparatus as claimed in claim 24, wherein said mounting for mounting said receptacle to said rocking device comprises at least one horizontally projecting protrusion for engaging the mounting channel.

26. An apparatus as claimed in claim 19, wherein said rocking mechanism is a hydraulic device.

27. An apparatus as claimed in claim 19, wherein said rocking mechanism is an electric motor.

28. An apparatus as claimed in claim 19, wherein the receptacle, mounting and container are enclosed in a housing.

29. An apparatus as claimed in claim 28, wherein the housing is an insulated box.

30. An apparatus as claimed in claim 28, wherein the housing comprises a venting system.

\* \* \* \* \*